UNITED STATES PATENT OFFICE.

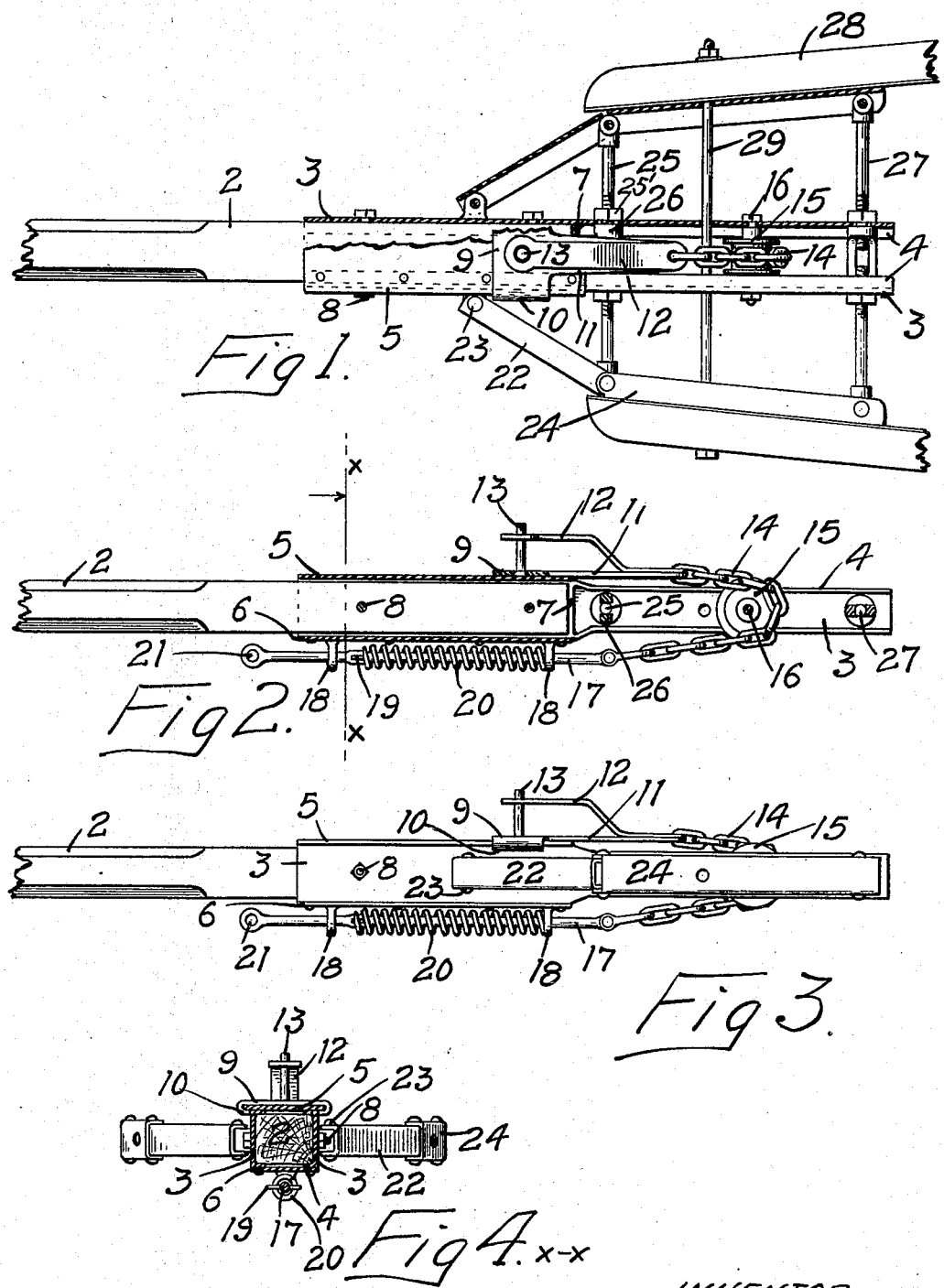

SOREN C. PAULSON, OF MINNEAPOLIS, MINNESOTA.

WAGON-POLE.

932,807.

Specification of Letters Patent.

Patented Aug. 31, 1909.

Application filed April 10, 1908. Serial No. 426,225.

*To all whom it may concern:*

Be it known that I, SOREN C. PAULSON, of Minneapolis, Hennepin county, Minnesota, have invented certain new and useful Improvements in Wagon-Poles, of which the following is a specification.

My invention relates to wagon poles, and the object of the invention is to provide means whereby an adjustment can be obtained between the pole and the forward axle hounds to compensate for the difference in distance between the hounds and render the pole capable of fitting any wagon.

A further object is to provide a spring starting device in connection with the pole, which whenever desired may also be utilized as an equalizer.

A further object is to provide means whereby the pole may be readily detached from the mechanism which connects it with the axle.

Other objects of the invention will appear from the following detailed description.

The invention consists generally in various constructions and combinations, all as hereinafter described and particularly pointed out in the claims.

In the accompanying drawings, forming part of this specification, Figure 1 is a plan view partially in section of a wagon pole and its connections embodying my invention. Fig. 2 is a longitudinal sectional view of the same. Fig. 3 is a side view illustrating the spring starting device adapted for use as an equalizer. Fig. 4 is a sectional view on the line $x-x$ of Fig. 2.

In the drawing, 2 represents a wagon pole having a squared rear end adapted to be inserted into a box that is composed preferably of side plates 3 having inwardly turned flanged edges 4 and top and bottom plates 5 and 6. The top plate 5 as indicated in Fig. 4, has its edges extending beyond the side plates 3 and the side plates extend back for a considerable distance beyond the top and bottom plates and are provided with inwardly projecting ribs 7 which form stops for the pole when it is thrust into the box. I prefer to secure the pole by means of bolts 8 passing through the side plates and through the pole, these bolts being easily removable whenever it is desired to remove the pole, as in a crowded market place.

A plate 9 has downwardly and inwardly turned ends 10 to engage the projecting edges of the top plate 5 and is adapted to slide freely thereon. This plate has a rearwardly extending arm 11 and a strap 12 has its rear portion resting upon said arm and is bent upwardly and forwardly therefrom and overhangs the plate 9 and is connected therewith by a pin 13 to which the pole horses are attached in the usual way. The chain 14 is connected to the arm 11 and strap 12 and extends down around a wheel 15 that is carried by a bolt 16 between the side plates 3, and the free end of said chain is connected to a rod 17 that is slidably supported in guides 18 depending from the plate 6. A wedge 19 fits within a transverse socket in the rod 17, and a coiled spring 20 is arranged on said rod between said wedge and one of the guides 18. The forward end of the rod 17 has an eye 21 to permit the attachment of the forward horses thereto when desired. When this is done the wedge plate 19 is removed, the spring 20 becomes inoperative, sliding freely on the rod 17 and the device becomes an equalizer distributing the strain between the forward and pole horses. When only the pole horses are used the wedge 19 is put in place and the spring 20 contacting with one of the guides 18 will yieldingly resist the strain of starting and relieve the pole horses of jar and shock incident to sudden jolts and rough roads.

It is desirable to provide some means for rendering the pole adjustable between the wagon hounds to adapt it for different wagons. I therefore provide bars 22 pivotally connected at 23 to the side plates 3. Similar bars 24 are provided forming a continuation of the bars 22 and having a common pivotal connection therewith to the outer ends of bolts 25 whose inner ends are threaded to receive a turn buckle 26 that extends transversely of the pole through holes in the side plates 3. The threaded ends of the bolts 25 are provided with lock nuts 25′ (see Fig. 1) between which and the turn buckles 26, the plates 3 are securely clamped. I am thus able to provide a rigid connection between the opposite bars 24 and prevent racking and twisting of the said bars and the danger of the pole pulling away from the hounds, which frequently occurs when an ordinary form of adjustment is provided for the bars, with which the hounds engage. By providing the lock nuts on each side of the plates, I may force the plates against the ends of the turn-buckles and prevent the turn buckles from working loose and hold all the parts rigidly between the hounds. The rear ends of the bars 24 are provided with similar bolts 27 whose inner ends are connected by a turn buckle similar to the one described. The forward axle hounds 28 lie on the outer side of the bars 24 and contact therewith and are secured thereto by a bolt 29 which passes through the hounds and through holes in the bars 24 and the side plates 3. By the adjustment of the turn buckles all lateral lost motion of the pole between the hounds can be taken up and the bars 22 and 24 adjusted to compensate for any variation in the distance between the hounds, and to cause the said bars to fit snugly and evenly thereon. Vertical oscillation of the pole is of course permitted by the horizontal pivot 29.

I claim as my invention:

1. The combination with axle hounds, of a pole box having a socket to receive a pole, plates projecting in the rear of said socket, bars arranged to bear on said hounds pivotally connected at their forward ends with said box, bolts having their outer ends pivotally connected with the said bars and their inner threaded ends projecting through holes in said plates, turn-buckles connecting the threaded ends of opposite bolts between said plates, and lock nuts provided on said bolts outside said plates and adapted to clamp them securely against the ends of said turn-buckles, substantially as described.

2. The combination with the axle hounds, of a pole box having a socket to receive a pole, channel-bar plates forming the side walls of said pole box and extending rearwardly beyond the pole socket, bars arranged to bear on said hounds and pivotally connected at their forward ends with said plates, bolts having their outer ends pivotally connected to the forward and rear portions of said bars and having their inner threaded ends projecting through holes in said channel-bar plates, and turn-buckles connecting the threaded ends of opposite bolts between said channel-bar plates; and lock nuts mounted on said bolts and arranged to engage said plates and force them against the ends of said turn-buckles, for the purpose specified.

3. The combination with the axle hounds, of a pole box having a socket to receive a pole, plates projecting in the rear of said socket, bars having outer faces arranged to bear on said hounds, links pivotally connecting said bars with the side walls of said socket, bolts pivotally connected to the rear ends of said bars, similar bolts pivotally connected to the hinged ends of said bars and said links, the inner ends of said bolts being threaded and projecting through holes in said plates, and turn-buckles provided between said plates and engaging the threaded ends of said bolts whereby the desired degree of adjustment is obtained between said bars and plates, substantially as described.

In witness whereof, I have hereunto set my hand this 4th day of April 1908.

SOREN C. PAULSON.

Witnesses:
RICHARD PAUL,
J. A. BYINGTON.